(12) United States Patent
Shin et al.

(10) Patent No.: US 9,417,904 B2
(45) Date of Patent: Aug. 16, 2016

(54) CYBER-PHYSICAL SYSTEM AND METHOD OF MONITORING VIRTUAL MACHINE THEREOF

(71) Applicant: Electronics and Telecommunications Research Institute, Daejeon (KR)

(72) Inventors: Jin Ah Shin, Daejeon (KR); Taeho Kim, Gunpo-si (KR); Chae Deok Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 97 days.

(21) Appl. No.: 14/327,923

(22) Filed: Jul. 10, 2014

(65) Prior Publication Data
US 2015/0082306 A1 Mar. 19, 2015

(30) Foreign Application Priority Data
Sep. 13, 2013 (KR) .......................... 10-2013-0110676

(51) Int. Cl.
*G06F 9/455* (2006.01)
(52) U.S. Cl.
CPC .. *G06F 9/45558* (2013.01); *G06F 2009/45579* (2013.01)
(58) Field of Classification Search
None
See application file for complete search history.

(56) References Cited

U.S. PATENT DOCUMENTS

| 7,577,482 B1* | 8/2009 | Steele | G05B 19/042 700/19 |
| 8,239,938 B2* | 8/2012 | Simeral et al. | G06F 9/45537 726/21 |
| 8,429,675 B1* | 4/2013 | Radhakrishnan et al. | G06F 9/45533 719/319 |
| 2006/0005184 A1* | 1/2006 | Tewari | G06F 9/45533 718/1 |
| 2008/0086726 A1* | 4/2008 | Griffith | G06F 9/544 718/1 |
| 2009/0113110 A1* | 4/2009 | Chen | G06F 9/4426 711/6 |
| 2009/0132840 A1* | 5/2009 | Talwar | G06F 1/3203 713/320 |

(Continued)

FOREIGN PATENT DOCUMENTS

KR 10-1091224 B1 12/2011
KR 10-1148364 B1 5/2012

Primary Examiner — Emerson Puente
Assistant Examiner — Mehran Kamran
(74) Attorney, Agent, or Firm — Rabin & Berdo, P.C.

(57) ABSTRACT

A cyber-physical system and a method of monitoring a virtual machine thereof are provided. The cyber-physical system includes a plurality of target controllers that includes middleware operating based on different operating systems and that control different targets, and a system monitor that includes integrated middleware of analyzing and synthesizing information collected from the middleware. First virtual machines corresponding to virtualization of the target controllers and a second virtual machine corresponding to virtualization of the system monitor are independently formed through a virtual machine monitor.

9 Claims, 4 Drawing Sheets

(56) References Cited

U.S. PATENT DOCUMENTS

| | | | |
|---|---|---|---|
| 2009/0254660 A1* | 10/2009 | Hanson | H04L 12/10 709/226 |
| 2010/0146620 A1* | 6/2010 | Simeral | G06F 9/45537 726/21 |
| 2010/0161953 A1* | 6/2010 | Memmott | G06Q 10/04 713/2 |
| 2010/0162259 A1* | 6/2010 | Koh | G06F 9/45558 718/104 |
| 2011/0219373 A1* | 9/2011 | Nam | G06F 9/455 718/1 |
| 2011/0225299 A1* | 9/2011 | Nathuji | G06F 9/5077 709/226 |
| 2011/0237234 A1* | 9/2011 | Kotani | G06F 8/65 455/418 |
| 2011/0246748 A1* | 10/2011 | Talwar | G06F 9/5077 712/30 |
| 2012/0054744 A1* | 3/2012 | Singh et al. | G06F 21/53 718/1 |
| 2012/0159454 A1* | 6/2012 | Barham et al. | G06F 9/45558 717/128 |
| 2012/0167078 A1* | 6/2012 | Arscott et al. | G06F 11/3409 718/1 |
| 2012/0265504 A1* | 10/2012 | Nambiar et al. | G06N 5/02 703/6 |
| 2012/0304285 A1* | 11/2012 | Simeral et al. | G06F 9/45537 726/21 |
| 2013/0067470 A1* | 3/2013 | Chen et al. | G06F 11/3093 718/1 |
| 2013/0139157 A1* | 5/2013 | Koh et al. | G06F 9/4555 718/1 |
| 2013/0155083 A1* | 6/2013 | McKenzie et al. | G06T 1/20 345/522 |
| 2014/0137115 A1* | 5/2014 | Tosa et al. | H04L 63/08 718/1 |
| 2015/0082315 A1* | 3/2015 | Overbeck | G06F 9/44547 718/102 |

* cited by examiner

CYBER-PHYSICAL SYSTEM AND METHOD OF MONITORING VIRTUAL MACHINE THEREOF

CROSS-REFERENCE TO RELATED APPLICATION

This application claims priority to and the benefit of Korean Patent Application No. 10-2013-0110676 filed in the Korean Intellectual Property Office on Sep. 13, 2013, the entire contents of which are incorporated herein by reference.

BACKGROUND OF THE INVENTION (a) Field of the Invention

The present invention relates to a cyber-physical system and a method of monitoring a virtual machine thereof.

(b) Description of the Related Art

An embedded system requiring high reliability has developed into a cyber-physical system form. A cyber-physical system (CPS) is a system that supports efficient control and determination by interlocking the real world and the virtual world, and is a circulation system that collects information of a peripheral physical environment by organically connecting a physical system of actual space to a computing environment and that searches for an appropriate service through operation of the collected information and again executes driving of the physical system.

As the use field of CPS is enlarged, fusion between physical system communication networks that are applied to an existing domain is necessary, but heterogeneous networks or middleware do not overcome heterogeneity of a system including operating systems that are optimized thereto.

In order to solve such a problem, integration middleware has been researched, but when multiple systems operate in the same platform, a problem that stability and independency cannot be guaranteed still exists.

SUMMARY OF THE INVENTION

The present invention has been made in an effort to provide a cyber-physical system and a method of monitoring a virtual machine thereof having advantages of being capable of stably performing independent processing of heterogeneous middleware.

An exemplary embodiment of the present invention provides a cyber-physical system including: a plurality of target controllers that comprises middleware operating based on different operating systems and control different targets, wherein the target comprises at least one of a sensor and an actuator; a system monitor comprising integrated middleware that analyzes and synthesizes information that is collected from the middleware; and a virtual machine monitor that forms first virtual machines by virtualizing each of the plurality of target controllers, forms a second virtual machine by virtualizing the system monitor, and performs information transmission between the target controllers operating on the basis of the first virtual machines and the system monitor operating on the basis of the second virtual machine.

The virtual machine monitor may perform information transmission between target controllers operating on the basis of the first virtual machines and the system monitor operating on the basis of the second virtual machine through a hypercall interface.

The virtual machine monitor may perform information transmission between target controllers operating on the basis of the first virtual machines and the system monitor operating on the basis of the second virtual machine through trapping of a preset specific command.

The virtual machine monitor may transmit information acquired from middleware that operates through the first virtual machines corresponding to virtualization of the target controllers to the integrated middleware that operates through the second virtual machine corresponding to virtualization of the system monitor, receives a control command from the integrated middleware, and transmits the control command to middleware corresponding to the control command among the target controllers.

The system monitor may include: a sensor registration unit that performs registration of a new sensor or actuator; a sensor release unit that performs release of an existing sensor or actuator; a sensor data acquisition unit that acquires information generated according to operation of the sensor from the target controller that comprises middleware corresponding to the sensor; and a service execution unit that analyzes sensor data, that selects one service among registered services based on an analysis result, that generates a control command for executing the selected service, and that transmits the control command to middleware of the target controller corresponding to the selected service.

The sensor registration unit of the system monitor may perform registration of a sensor or an actuator according to re-execution of the first virtual machine, and the sensor release unit performs release of the sensor or the actuator according to termination of the first virtual machine.

Another embodiment of the present invention provides a method of monitoring a virtual machine in a cyber-physical system including a plurality of target controllers including middleware operating based on different operating systems and that control different targets, and a system monitor including integrated middleware that analyzes and synthesizes information that is collected from the middleware, the method including: transmitting, by a virtual machine monitor, information that is acquired from middleware operating through first virtual machines corresponding to virtualization of the target controllers to the integrated middleware operating through a second virtual machine corresponding to virtualization of the system monitor; and receiving, by the virtual machine monitor, a control command from the integrated middleware and transmitting the control command to middleware corresponding to the control command among the target controllers.

In the transmitting of information that is acquired from middleware, the virtual machine monitor may transmit the information that is acquired from the middleware to the integrated middleware through a hypercall interface, and in the transmitting of the control command to middleware, the virtual machine monitor may transmit the control command received from the integrated middleware to corresponding middleware through the hypercall interface.

Also, in the transmitting of information that is acquired from middleware, the virtual machine monitor may transmit the information that is acquired from the middleware to the integrated middleware through trapping of a preset specific command, and in the transmitting of the control command to middleware, the virtual machine monitor may transmit the control command received from the integrated middleware to corresponding middleware through trapping of a preset specific command.

The method may further include selecting, by the integrated middleware, one among registered services based on information that is acquired from each middleware through the virtual machine monitor, and generating a control command for controlling an actuator corresponding to the selected service.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In addition, in the specification and claims, unless explicitly described to the contrary, the word "comprise" and variations such as "comprises" or "comprising" will be understood to imply the inclusion of stated elements but not the exclusion of any other elements.

Hereinafter, a cyber-physical system and a method of monitoring a virtual machine thereof according to an exemplary embodiment of the present invention will be described.

Figure 1:
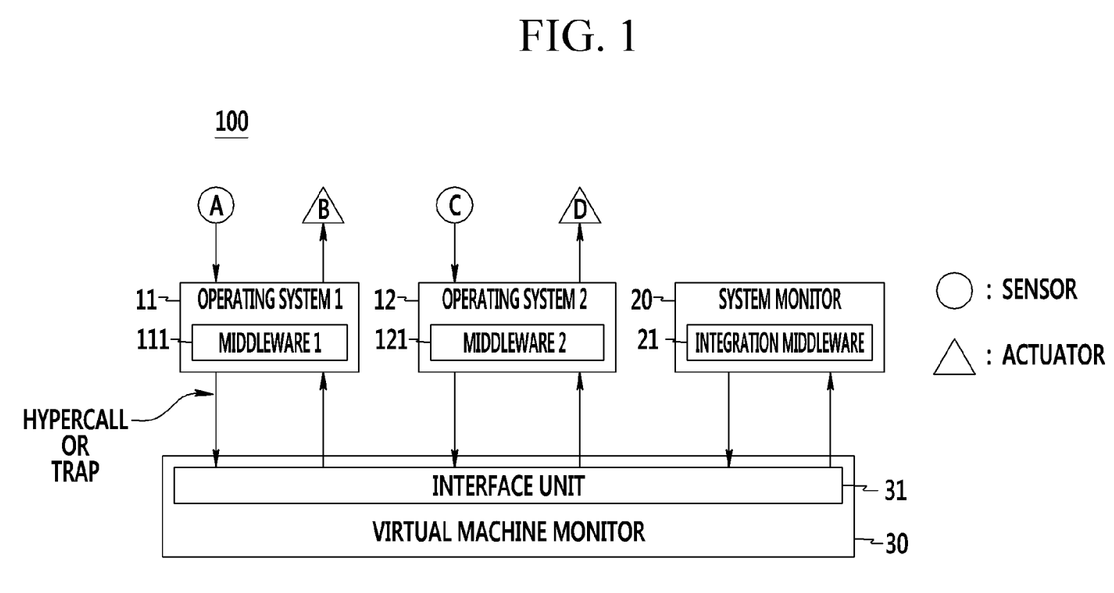
FIG. 1 is a block diagram illustrating a structure of a cyber-physical system according to an exemplary embodiment of the present invention.

FIG. 1 is a block diagram illustrating a structure of a cyber-physical system according to an exemplary embodiment of the present invention.

As shown in FIG. 1, a cyber-physical system 100 according to an exemplary embodiment of the present invention includes a plurality of target controllers 11 and 12 that manage and control a sensor or an actuator of a target domain based on an operating system, a system monitor 20 that searches for a corresponding service based on information that is collected through each of the target controllers 11 and 12 and that determines whether to execute the service, and a virtual machine monitor 30.

The target controllers 11 and 12 operate a target (here, a target indicates a control target and includes, for example, various sensors or actuators) based on respective independent operating systems, and collect information from the target. The target controllers 11 and 12 include middleware 111 and 121, respectively, for communicating with the virtual machine monitor 30. Here, two target controllers are exemplified, but the present invention is not limited thereto.

The system monitor 20 selects an appropriate service among registered services based on information about targets of each of the target controllers 11 and 12 that are provided through the virtual machine monitor 30, and generates and transfers a command for executing the selected appropriate service. Such a system monitor 20 includes integration middleware 21 for communicating with the virtual machine monitor 30. The integration middleware 21 is middleware that analyzes and synthesizes information that is collected from each of the middleware 111 and 121. Information that is collected from each middleware may be defined according to a series of standards and protocols, and a parameter necessary for communication between the integration middleware 21 and middleware may be determined according to a defined content.

The virtual machine monitor 30 forms a corresponding virtual machine by virtualizing each of the target controllers 11 and 12, and forms a corresponding virtual machine by virtualizing the system monitor 20. The target controllers 11 and 12 operate on a corresponding virtual machine, and an operating system of each of the target controllers 11 and 12 recognizes and operates a logic resource that is allocated to a virtual machine as a physical resource. Further, the system monitor 20 recognizes and operates a logic resource that is allocated to a corresponding virtual machine as a physical resource.

The virtual machine monitor 30 according to an exemplary embodiment of the present invention virtualizes only a device necessary when each middleware operates like a sharing device (e.g., a memory and a central processing unit (CPU)) among physical resources, and does not virtualize a specific device (e.g., a sensor and an actuator) that each middleware, except for such a sharing device, requires. In this way, by virtualizing only a necessary device, a function of a virtual machine monitoring device can be minimized.

The virtual machine monitor 30 provides information that is collected from each of the target controllers 11 and 12 to a virtual machine corresponding to the system monitor 20, receives a control command from the system monitor 20, and transfers the control command to a corresponding virtual machine, i.e., a target controller.

For this purpose, the virtual machine monitor 30 includes an interface unit 31 for communication between middleware of each of the target controllers 11 and 12 and the system monitor 20. The interface unit 31 acquires information that is collected by communicating with middleware of each of the target controllers 11 and 12 through inter-process communication (IPC), and provides a control command that is provided from the system monitor 20 to middleware of a corresponding target controller.

The virtual machine monitor 30 performs virtualization based on half virtualization or full virtualization.

When virtualization is performed based on half virtualization, a guest operating system controls hardware through the virtual machine monitor 30 that functions as a hypervisor instead of directly controlling hardware. Each operating system of the target controllers 11 and 12 transmits information that is collected from a corresponding target through a hypercall interface to the virtual machine monitor 30, and the virtual machine monitor 30 transmits a control command from the system monitor 20 through a hypercall interface to a corresponding target controller.

When virtualization is performed based on full virtualization, the virtual machine monitor 30 traps and handles specific commands. When each of the target controllers 11 and 12 performs a specific command by processing collected information or records collected information at a specific memory, the virtual machine monitor 30 traps this and transfers corresponding information to the system monitor 20.

The system monitor 20 processes a hypercall or trap of the following function through the virtual machine monitor 30.

The integration middleware 21 of the system monitor 20 performs registration of a new sensor or actuator, release of an existing sensor or actuator, input of information that is generated according to operation of a sensor, execution of a service, and termination and re-execution of a virtual machine in which each middleware is included.

Specifically, when a new sensor or actuator is registered instead of an existing sensor or actuator, middleware of a corresponding target controller analyzes and registers information about the registered sensor or actuator and transmits information thereof to the integration middleware 21 of the system monitor 20 through a virtual machine monitoring unit. The system monitor 20 manages information about a newly registered sensor or actuator that is received through the integration middleware 21.

Further, when an existing sensor or actuator is in a disabled state, middleware of a corresponding target controller releases registration of a sensor or an actuator in the disabled state in real time and transmits information about the released sensor or actuator to the integration middleware 21 of the system monitor 20 through the virtual machine monitor 30. The system monitor 20 releases a corresponding sensor or actuator from the managed information based on information that is received through the integration middleware 21.

Further, when the sensor operates, information that is input from the sensor has an information value according to a change of an environment. The sensor transfers an information value according to a sensing operation to specific middleware based on a determined protocol, and middleware of a target controller that receives the information value processes the information value and transmits the information value to the integration middleware 21 of the system monitor 20 through the virtual machine monitor 30. The system monitor 20 may recognize a change of an environment based on an information value, i.e., sensor data that is received from the integration middleware 21.

Further, the system monitor 20 enables a service to be executed. The system monitor 20 analyzes sensor data that is received from each target controller, selects an appropriate service among registered services based on an analysis result, generates a control command for executing the selected service, and transmits the generated control command to a virtual machine in which corresponding middleware is included. That is, the system monitor 20 transmits a control command to an operating system of a target controller corresponding to an actuator that is related to a service through the virtual machine monitor 30, and enables operation according to the control command to be performed.

Further, the system monitor 20 may control termination and re-execution of a virtual machine in which each middleware is included. When a virtual machine including middleware of each target controller is terminated or re-executed, by interlocking thereto, a corresponding sensor or actuator may be registered or released. The registration or release process may be performed as described above.

Figure 2:
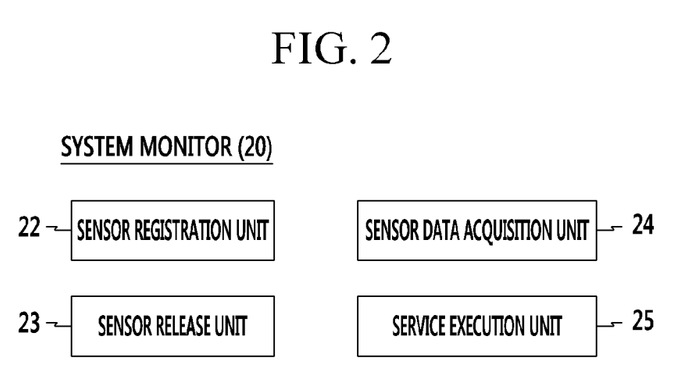
FIG. 2 is a block diagram illustrating a structure of a system monitor according to an exemplary embodiment of the present invention.

In order to perform the above-described function, the system monitor 20 may have a structure of FIG. 2. FIG. 2 is a block diagram illustrating a structure of the system monitor 20.

The system monitor 20 may include a sensor registration unit 22, a sensor release unit 23, a sensor data acquisition unit 24, and a service execution unit 25, as shown in FIG. 2. The sensor registration unit 22 performs registration of a new sensor or actuator, the sensor release unit 23 performs release of an existing sensor or actuator, and the sensor data acquisition unit 24 acquires information that is generated according to operation of the sensor. The service execution unit 25 analyzes sensor data, selects an appropriate service among registered services based on an analysis result, generates a control command for executing the selected service, and transmits the generated control command to middleware of a corresponding target controller. Registration of a sensor and an actuator according to termination and re-execution of a virtual machine including middleware may be performed through the sensor registration unit 22, and release of the sensor and the actuator according to termination and re-execution of a virtual machine may be performed through the sensor release unit 23. Each of the units 21-25 of such a system monitor 20 may be formed to be included in the integration middleware 21 or may be separately formed.

Hereinafter, a virtual monitoring method of a cyber-physical system according to an exemplary embodiment of the present invention based on the above structure will be described.

Figure 3:
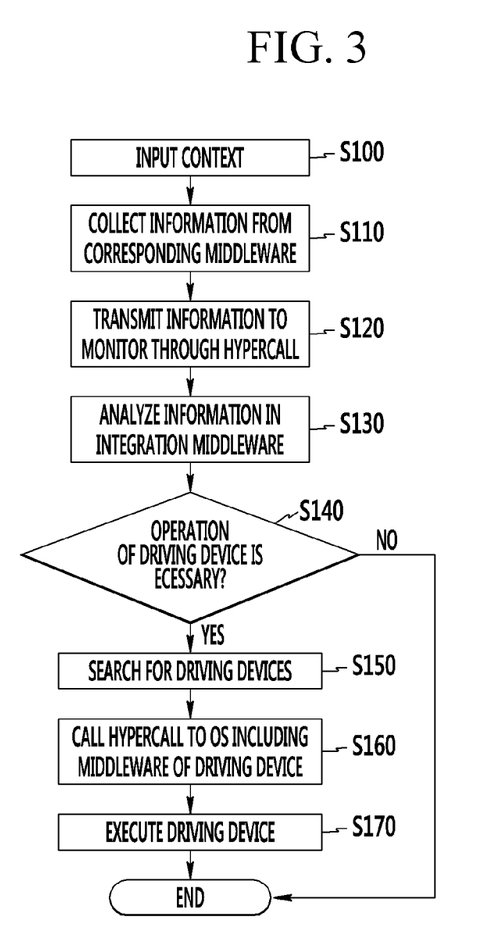
FIG. 3 is a flowchart illustrating a virtual monitoring method according to a first exemplary embodiment of the present invention.

FIG. 3 is a flowchart illustrating a virtual monitoring method according to a first exemplary embodiment of the present invention.

A first exemplary embodiment of the present invention illustrates a method of monitoring a virtual machine based on half virtualization.

In the cyber-physical system 100, middleware of each of the target controllers 11 and 12 receives an input of an information value according to an environment change through a sensor according to an input of context (S100 and S110), and by processing the input information value, the middleware generates sensor data. The middleware transmits sensor data to the virtual machine monitor 30 through a hypercall (S120).

The virtual machine monitor 30 transfers sensor data that is input through the hypercall to the system monitor 20, and the system monitor 20 receives the sensor data through the virtual machine monitor 30. The system monitor 20 analyzes the sensor data (S130) and determines whether operation of an actuator, i.e., a driving device, is necessary based on an analysis result (S140), and if operation of an actuator, i.e., a driving device, is necessary based on an analysis result, the system monitor 20 searches for requested driving devices and operates the found driving devices (S150). Specifically, when an appropriate service exists in registered services based on the analysis result of sensor data, the system monitor 20 determines that operation of a driving device is necessary, and the system monitor 20 searches for driving devices necessary for executing a corresponding service. The system monitor 20 generates a control command for operating the found driving devices, and transmits the generated control command to the virtual machine monitor 30 through a hypercall (S160).

The virtual machine monitor 30 transfers the control command to middleware of a corresponding target controller and enables a corresponding service to be executed by operating a target, i.e., an actuator, according to the control of middleware (S170).

Figure 4:
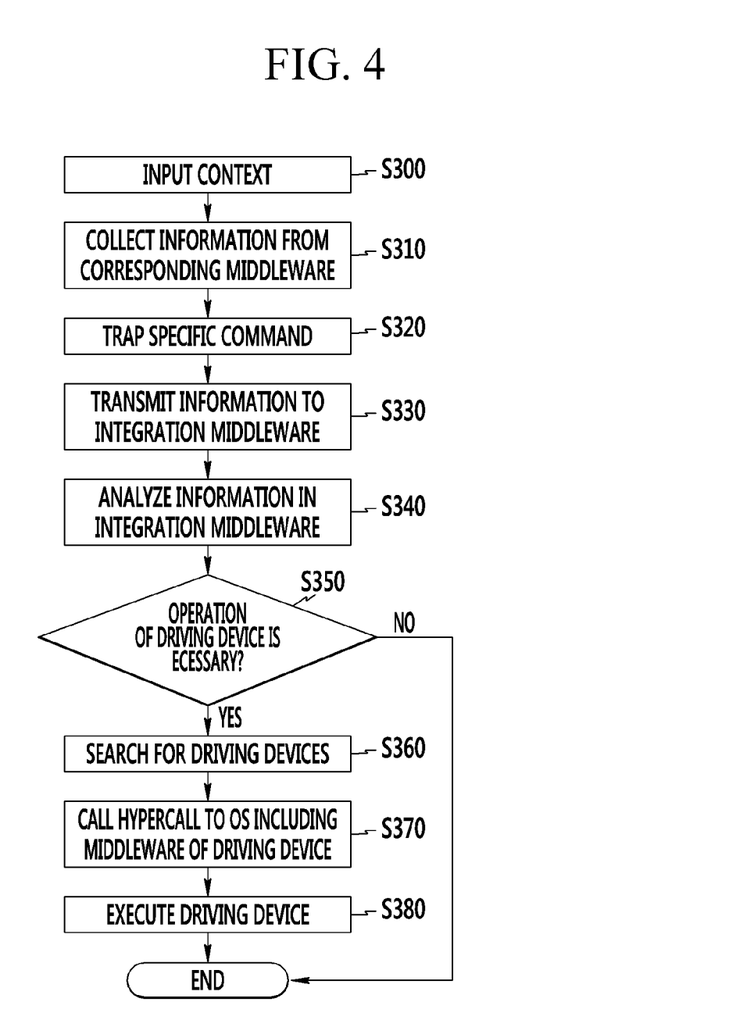
FIG. 4 is a flowchart illustrating a virtual monitoring method according to a second exemplary embodiment of the present invention.

FIG. 4 is a flowchart illustrating a virtual monitoring method according to a second exemplary embodiment of the present invention.

A second exemplary embodiment of the present invention illustrates a method of monitoring a virtual machine based on full virtualization.

In the cyber-physical system 100, middleware of each of the target controllers 11 and 12 receives an input of an information value according to an environment change through a sensor according to an input of context (S300 and S310), and generates sensor data by processing the input information value. When a specific command for transmitting sensor data is generated, the virtual machine monitor 30 traps the specific command (S320), converts the specific command to a safe command that can be virtualized, and transmits sensor data to the system monitor 20 according to a corresponding command (S330).

Thereafter, as in the first exemplary embodiment, the system monitor 20 analyzes sensor data, determines whether operation of a driving device according to an analysis result is necessary, and searches for requested driving devices, and then when a control command for operating the found driving devices is generated (S340, S350, and S360), the control command is transferred to middleware of a corresponding target controller through the virtual machine monitor 30 (S370). In this case, the virtual machine monitor 30 may trap a specific command of the system monitor 20 and transfer a control command to corresponding middleware.

Thereafter, a target, i.e., an actuator, is operated according to the control of middleware, and thus a corresponding service is executed (S380).

According to an exemplary embodiment of the present invention, in a cyber-physical system, heterogeneous middleware may be driven as respective independent virtual machines on a virtual machine monitor. Further, by constructing integration middleware that integrally manages middleware in a new virtual machine form, a cyber-physical system can be efficiently operated.

Accordingly, because an erroneous operation of one middleware (or operating system) does not have an influence on other middleware, a cyber-physical system having high reliability can be constructed. Further, maintenance of addition and deletion of middleware can be easily performed.

An exemplary embodiment of the present invention may not only be embodied through the above-described apparatus and/or method but may also embodied through a program that executes a function corresponding to a configuration of the exemplary embodiment of the present invention or through a recording medium on which the program is recorded, and can be easily embodied by a person of ordinary skill in the art from the description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cyber-physical system, comprising:
    a plurality of target controllers, each of which includes middleware operating based on a different operating system and is configured to control a different target, the target including at least one of a sensor and an actuator;
    a system monitor comprising integrated middleware configured to analyze and synthesize information collected by the middleware of the target controllers, the system monitor including
        a sensor registration unit that performs registration of a new sensor or actuator,
        a sensor release unit that performs release of an existing sensor or actuator,
        a sensor data acquisition unit that acquires information generated according to operation of the existing sensor from one of the target controllers that comprises middleware corresponding to the existing sensor, and
        a service execution unit that analyzes sensor data, that selects one service among registered services based on an analysis result, that generates a control command for executing the selected service, and that transmits the control command to the middleware of one of the target controllers corresponding to the selected service; and
    a virtual machine monitor configured to
        form a plurality of first virtual machines by virtualizing each of the plurality of target controllers,
        form a second virtual machine by virtualizing the system monitor, and perform information transmission between the target controllers operating on the basis of the first virtual machines and the system monitor operating on the basis of the second virtual machine.

2. The cyber-physical system of claim 1, wherein the virtual machine monitor performs information transmission between target controllers operating on the basis of the first virtual machines and the system monitor operating on the basis of the second virtual machine through a hypercall interface.

3. The cyber-physical system of claim 1, wherein the virtual machine monitor performs information transmission between target controllers operating on the basis of the first virtual machines and the system monitor operating on the basis of the second virtual machine through trapping of a preset specific command.

4. The cyber-physical system of claim 1, wherein the virtual machine monitor
    transmits information acquired from the middleware of the target controllers through the first virtual machines corresponding to the virtualization of the target controllers to the integrated middleware of the system monitor through the second virtual machine corresponding to the virtualization of the system monitor,
    receives a control command from the integrated middleware of the system monitor, and
    transmits the control command to middleware corresponding to the control command among all middleware of the target controllers.

5. The cyber-physical system of claim 1, wherein
    the sensor registration unit of the system monitor performs registration of a sensor or an actuator according to re-execution of one of the first virtual machines corresponding to one of the target controllers that controls the sensor or the actuator, and
    the sensor release unit performs release of the sensor or the actuator according to termination of the one first virtual machine.

6. A method of monitoring a virtual machine in a cyber-physical system comprising
    a plurality of target controllers, each of which includes middleware operating based on a different operating system and is configured to control a different target,
    a system monitor comprising integrated middleware configured to analyze and synthesize information collected by the middleware of the target controllers, the system monitor including
        a sensor registration unit that performs registration of a new sensor or actuator,
        a sensor release unit that performs release of an existing sensor or actuator,
        a sensor data acquisition unit that acquires information generated according to operation of the existing sensor from one of the target controllers that comprises middleware corresponding to the existing sensor, and
        a service execution unit that analyzes sensor data, that selects one service among registered services based on an analysis result, that generates a control command for executing the selected service, and that transmits the control command to the middleware of one of the target controllers corresponding to the selected service, and a virtual machine monitor configured to form a plurality of first virtual machines by virtualizing each of the plurality of target controllers, and form a second virtual machine by virtualizing the system monitor, the method comprising:

transmitting, by the virtual machine monitor, information that is acquired from middleware of the target controllers through the first virtual machines corresponding to the virtualization of the target controllers to the integrated middleware of the system monitor through the second virtual machine corresponding to the virtualization of the system monitor; and receiving, by the virtual machine monitor, a control command from the integrated middleware of the system monitor and transmitting the control command to the middleware of one of the target controllers corresponding to the control command.

7. The method of claim 6, wherein the transmitting of the information that is acquired from the middleware includes transmitting the information to the integrated middleware through a hypercall interface, and the transmitting of the control command to the middleware includes transmitting the control command to the corresponding middleware through the hypercall interface.

8. The method of claim 6, wherein the transmitting of the information that is acquired from the middleware includes transmitting the information to the integrated middleware through trapping of a preset specific command, and the transmitting of the control command to the middleware includes transmitting the control command to the corresponding middleware through the trapping of the preset specific command.

9. The method of claim 6, further comprising selecting, by the integrated middleware, one among registered services based on information that is acquired from each middleware through the virtual machine monitor, and generating a control command for controlling an actuator corresponding to the selected service.

\* \* \* \* \*